United States Patent
Schilling et al.

(10) Patent No.: US 9,478,322 B1
(45) Date of Patent: Oct. 25, 2016

(54) STORAGE AND TRANSPORTATION METHOD FOR LOW LEVEL RADIOACTIVE MIXED WASTES

(71) Applicants: Michael Schilling, Clinton, LA (US); Michael Sanchez, Clinton, LA (US); Troy Town, Clinton, LA (US); William Smart, Knoxville, TN (US)

(72) Inventors: Michael Schilling, Clinton, LA (US); Michael Sanchez, Clinton, LA (US); Troy Town, Clinton, LA (US); William Smart, Knoxville, TN (US)

(73) Assignee: PacTec, Inc., Clinton, LA (US)

( * ) Notice: Subject to any disclaimer, the term of this patent is extended or adjusted under 35 U.S.C. 154(b) by 50 days.

(21) Appl. No.: 14/677,390

(22) Filed: Apr. 2, 2015

(51) Int. Cl.
  *G21F 1/00* (2006.01)
  *G21F 5/12* (2006.01)
(52) U.S. Cl.
  CPC ........................................ *G21F 5/12* (2013.01)
(58) Field of Classification Search
  CPC .......................................................... G21F 1/00
  USPC ............................................................ 588/16
  See application file for complete search history.

(56) References Cited

U.S. PATENT DOCUMENTS

| | | | |
|---|---|---|---|
| 6,450,356 B1 | 9/2002 | Alexander et al. | |
| 7,073,676 B1 | 7/2006 | Town | |
| 7,074,174 B2 | 7/2006 | Lindgren et al. | |
| 8,129,702 B2 * | 3/2012 | Bakker | B82Y 10/00 250/492.1 |
| 8,894,281 B2 | 11/2014 | Town et al. | |
| 8,894,282 B2 | 11/2014 | Town et al. | |

\* cited by examiner

*Primary Examiner* — Edward Johnson
(74) *Attorney, Agent, or Firm* — Jones Walker LLP

(57) ABSTRACT

A method for preparing low level radioactive hazardous wastes (LLHZ) for disposal in a landfill. The method includes providing a softsided transportable container at a hazardous debris collection site, where the softsided container has at least three layers of materials, an outer, middle and an inner layer, where the middle layer is a water impervious material. Each layer has a closable opening located on the top of the softsided layer. Hardsided closed containers containing LLHZ located in the interior of the hard container are loaded into the interior of the softsided container. Each layer of the softsided container is then closed, and the package transported and shipped to a disposal site for burial.

20 Claims, 4 Drawing Sheets

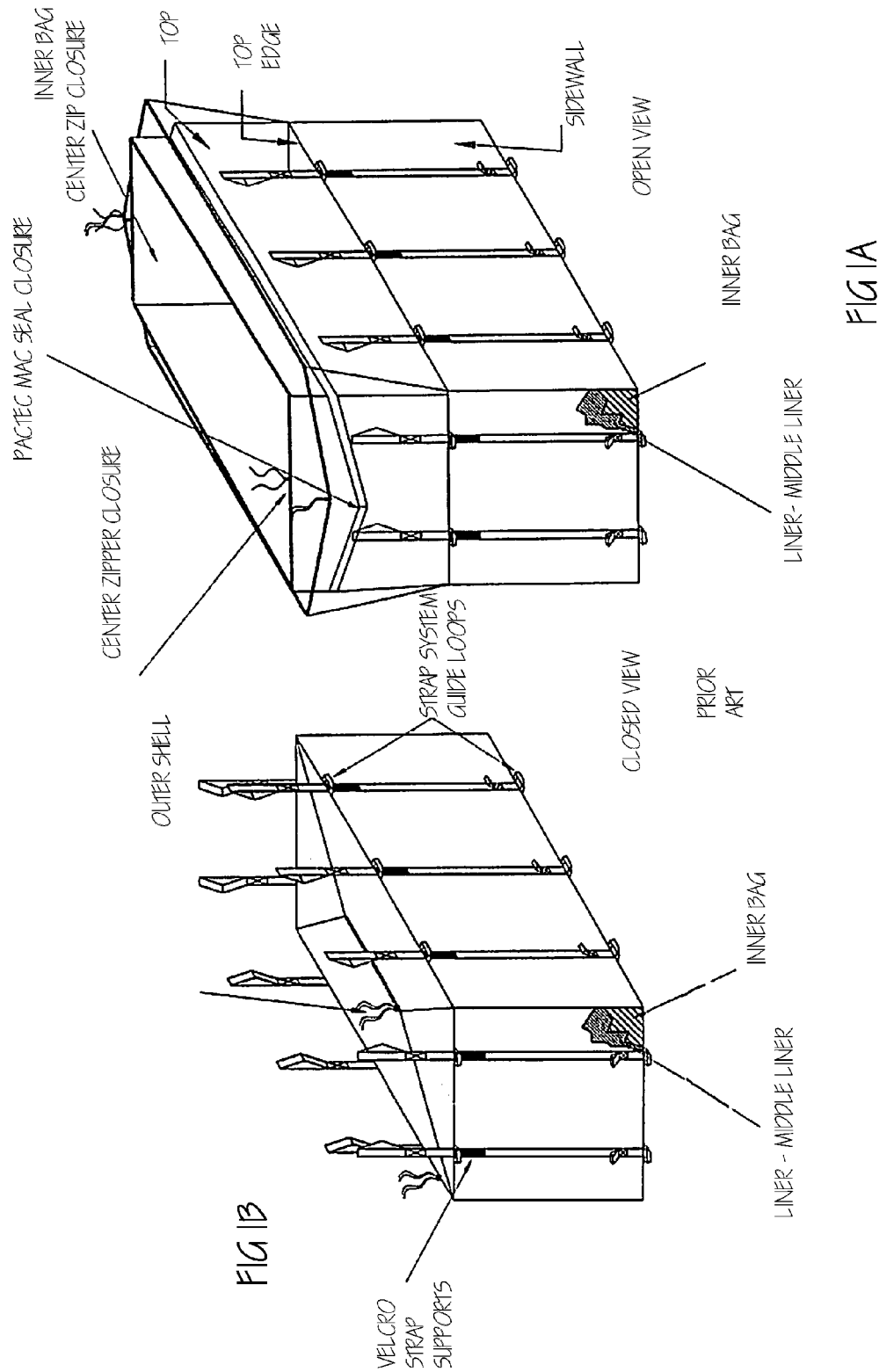

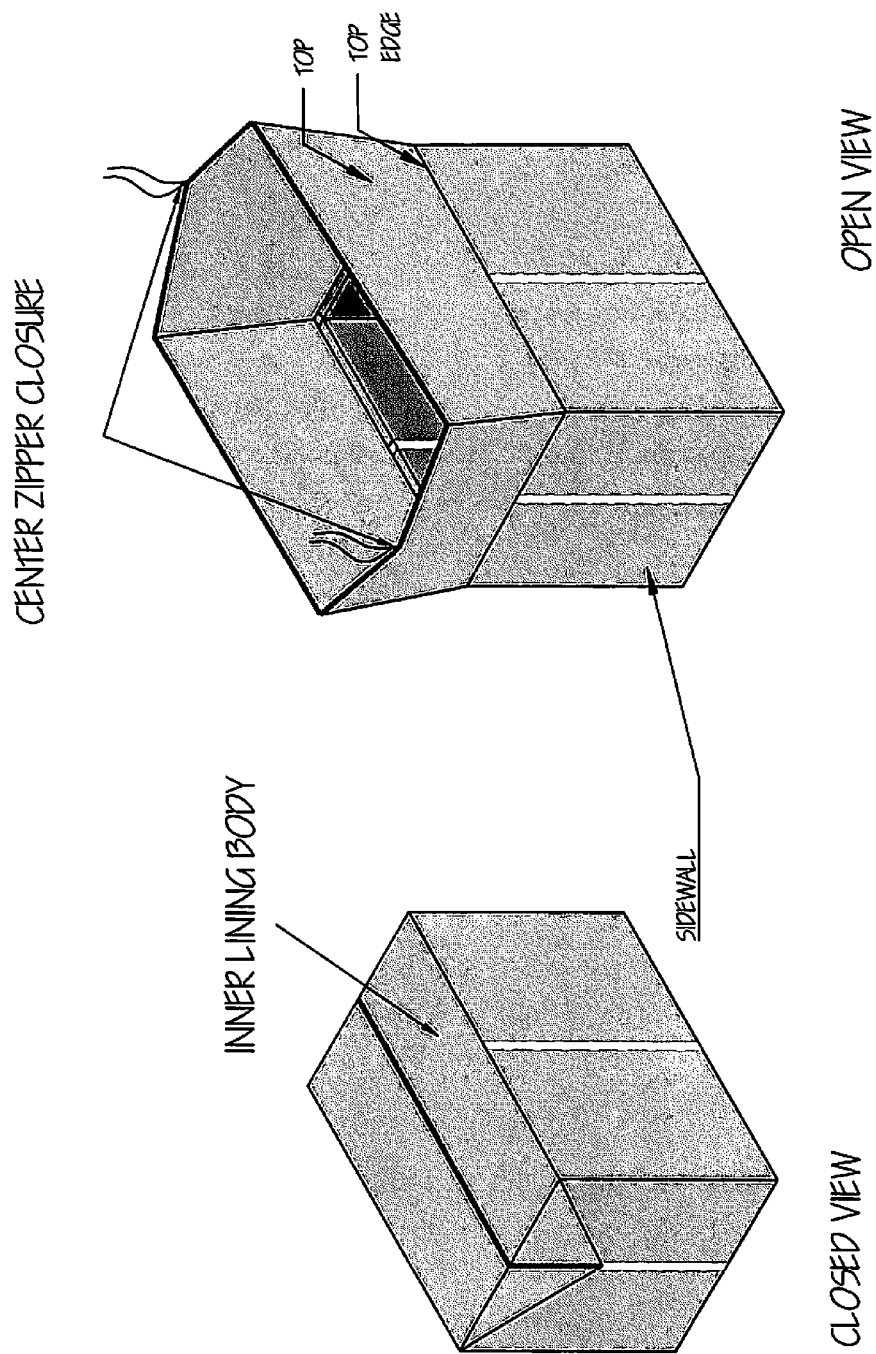

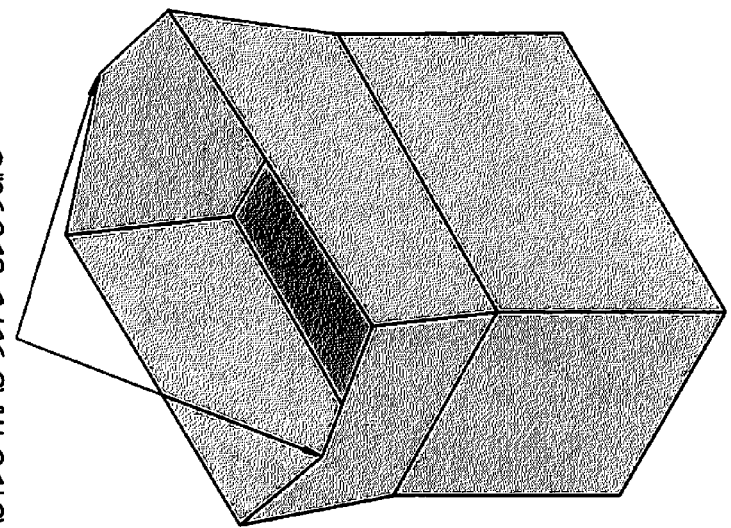
FIG 3A OPEN VIEW
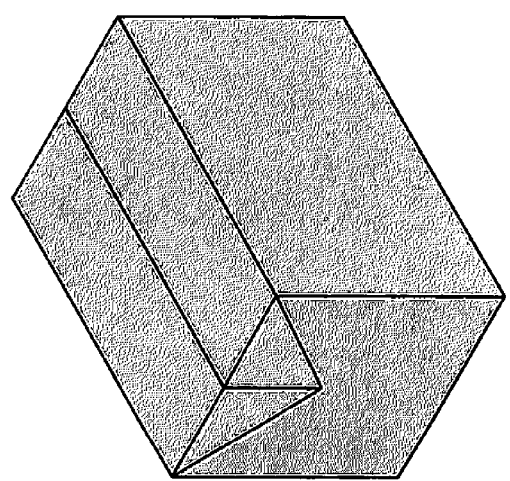
FIG 3B CLOSED VIEW

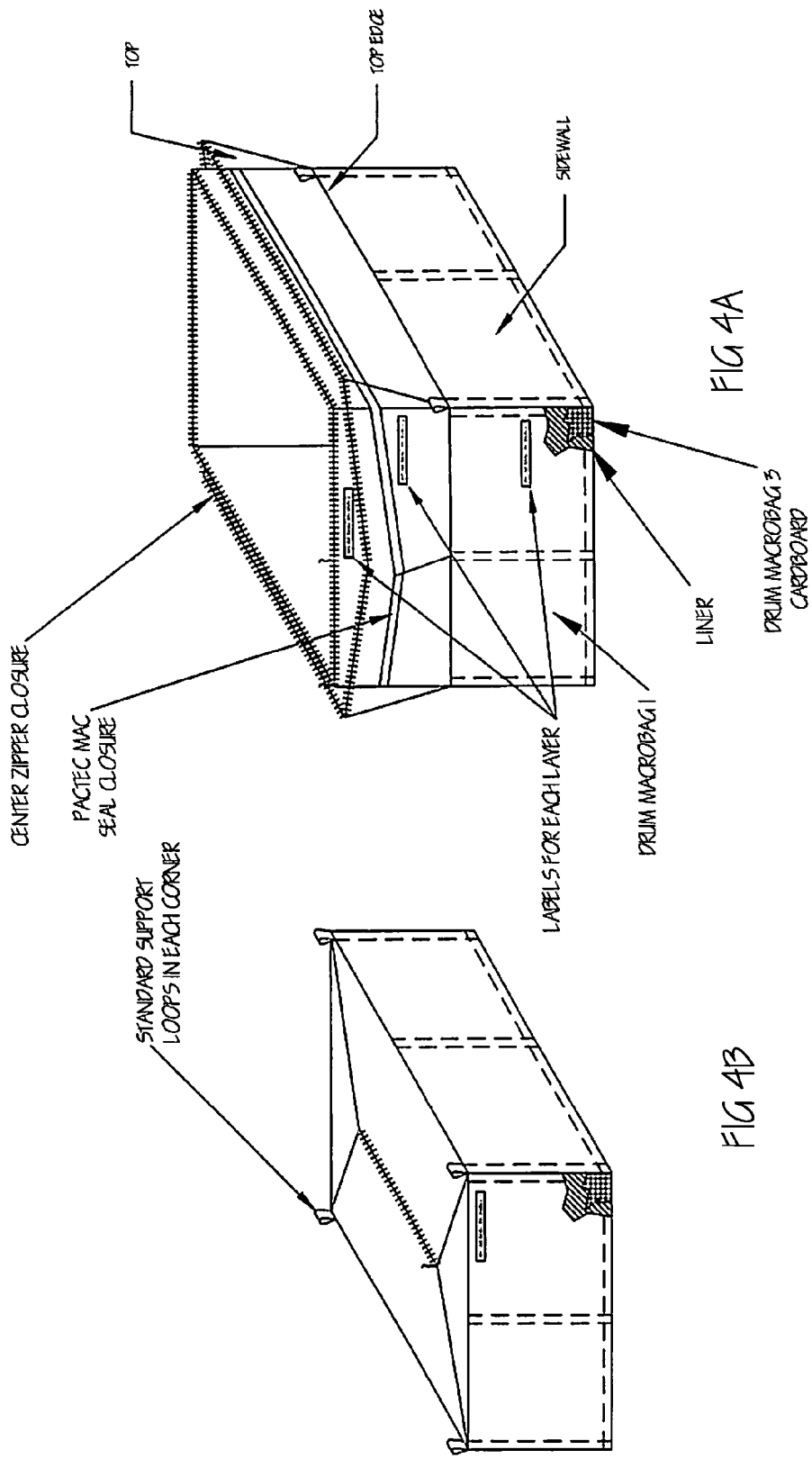

STORAGE AND TRANSPORTATION METHOD FOR LOW LEVEL RADIOACTIVE MIXED WASTES

FIELD OF THE INVENTION

The present invention relates methods and apparatus for safely disposing of low level radioactive contaminated hazardous waste materials using a soft sided packaging into which is loaded a hard-sided container.

The present invention relates, in general, to methods for disposing radioactive-containing solid hazardous waste materials. More particularly, the present invention relates to the disposal of low level radioactive hazardous wastes by using macroencapsulation techniques of the wastes within a metal container and surrounding the metal container with a system of soft sided packaging.

BACKGROUND OF THE INVENTION

Low level radioactive contaminated hazardous solid waste materials and debris are generated during industrial maintenance, spill response, and building decontamination projects. Such debris can include piping, pumps, valves, duct work, process tanks, wooden and concrete flooring, spill control booms, personnel protective equipment (PPE), soils and a wide variety of other solid items. Disposal of such radioactive contaminated hazardous waste materials is a major concern in the U.S. Low level radioactive contaminated wastes are defined in the Low level Radioactive Waste Policy Act of 1985, as later amended (including Class A, B and C wastes) 40 USC 2021, and also in 10 CFR 61.2. Low level radioactive wastes are generally defined as radioactive waste not classified as high-level radioactive waste (those being transuranic waste, spent nuclear fuel, or byproduct material as defined in section 11e.(2) of the Atomic Energy Act). Low level radioactive wastes characterization does not depend on the level of radioactivity it contains. Solid wastes are defined in Resource Conservation and Recovery Act (RCRA). Hazardous wastes are solid wastes meeting certain criteria as established in (and regulated by) RCRA. See for instance, 40 CFR Part 261. Mixed Wastes are a specific class of hazardous wastes, and include a mix of low level radioactive wastes and hazardous wastes, and are regulated by both RCRA and the Atomic Energy Act (AEA). These types of contaminated materials are generally disposed in landfills, but the contaminated solid materials have to be properly treated and "packaged" for disposal to reduce the potential for spread of contamination by leachate. While the materials of concern are solid materials (as opposed to liquid), some entrained liquids may be present in the materials. In the following, the materials are understood to be such solid low level radioactive contaminated hazardous wastes or "mixed wastes" (as classified by DOE and NRC).

Generally, the contaminated materials are stored on site in temporary containers, such as metal drums or boxes. For transport and disposal, the materials are moved out of the temporary storage containers to an approved disposal container and the approved disposal container is then buried in a landfill. An approved disposal container is generally a highly corrosion resistant container, such as a stainless steel container or a plastic drum or box. Prior to burying of the approved disposal container, the container will be sealed shut, such as by welding the container top shut to prevent fluids from entering or exiting the container. Standard metal boxes or standard metal drums cannot be used for ultimate disposal, unless the hazardous materials in the interior of the metal box are encased in an encapsulating material within the metal container, such as Portland cement. However, encasement of the materials makes that container heavy, and presents problems in shipping due to the weight.

As mentioned, low level radioactive hazardous waste materials may be disposed of using a macro-encapsulation technique. Macroencapsulation is defined as encapsulation of the hazardous materials with (1) surface coating materials or (2) use of a jacket of inert inorganic materials to substantially reduce surface exposure to potential leaching media. See 40 CFR 268.42 One method and device for macroencapsulation of hazardous wastes is described in U.S. Pat. No. 7,074,174, hereby incorporated by reference. As described in that reference, a soft-sided roll off container liner is used. The liner is placed in a standard roll off container, and a layer of treat reagent is placed on the bottom of the liner to absorb fluids that may be present in the wastes. The hazardous wastes are then loaded into the liner interior, and finally free flowing reagents are added (such as Portland cement, or organic activated charcoal) around the hazardous wastes. The softsided liner has three layers of materials, and innermost and outermost layers are closable with a zipper. Once the loaded liner is sealed closed, the roll off container is transported to the disposal side, and the liner/hazardous materials are then slid out of the roll off container for burial. As described, the line's inner layer is a pad or mat or membrane formed from a polyolefin or polyester (such as polytetrafluorethylene), the middle layer is a high density film, (such as a polyethylene, polypropylene or other liquid impervious and chemically resistant synthetic material), and the outer layer is a tear and puncture resistant fabric such as woven polypropylene or polyethylene. However, the requirement of a macroencapsulation layer of Portland cement also makes transportation of such a loaded bag problematic.

Another prior art device and disposal method for disposal of low level radioactive hazardous waste contaminated materials is using a softsided container used as a macroencapsulation device, available from PacTec as HMPPS product, shown in FIGS. 1A and 1B. The HMPPS bag is constructed using a three layer design, having an innermost layer of 12 oz non-woven polypropylene, a middle layer of 12 mil reinforced polyethylene layer, and an outer lay of preferably, 12 oz non-woven polypropylene. The outer layer may include water resistant exterior coating, such as a 3 ml polyethylene coating. Each of the three layers is in essence a separate softsided bag, each with separate closable openings. Each bag has a sidewall, a top portion, a bottom portion a top edge (where the sidewall meets the top portion), and the bags have openings only on the top portion. In a center zip embodiment, the top of portion of the bag can extend substantially above the top edge of the bag.

The final assembled product results in a nested series of bags or layers. These three "bags' may be joined together, such as sewn together or heat welded together or adhesively bonded, but this is not preferred. The innermost and outermost layers are closeable with a zipper, while the middle layer is closeable with a "ziplock" type of zipper closure device. Each layer can be opened and closed independently from the other layers. The preferred construction is to have the zippers (including ziploc type of toothless zipper closures) traverse down the center of the top portion of each bag, much like the closable opening shown in the U.S. Pat. No. 8,894,282, (incorporated by reference). Cardboard inserts may be provided to line the interior sidewalls to allow the assembled product to be self-standing.

To use the HMPPS softsided container, the three layer container is positioned in a metal shipping container (possibly by placing one bag in the container at a time) or using the cardboard inserts, set up as a self-standing container. All of the layers are opened and the hazardous materials loaded into the container. Preferably a layer of absorbent material (such as sand, kitty litter, plastic or foam pellets, etc.) is placed on the bottom of the innermost layer. LLHZ debris is then loaded into the interior of the disposal bag. Once filled, the remaining void space in the resulting loaded container preferably should be less that 10%, or as required by the disposal site operator. The layers are then closed. The loaded container (or container within a shipping container) is placed on a shipping vehicle for transport to the disposal site. At the disposal site, the bag may be moved using a lifting harness or sling coupled to the exterior of the bag, with a lifting frame or crane (as disclosed in U.S. Pat. No. 8,894,282) or the loaded bag may be slid out of the container for disposal (not preferred) for burial at the site.

The two bags described above are not used for disposal of heavy debris (such as more than 80 lbs per item), or debris having sharp or jagged edges, as the integrity of the bag with such heavy or sharp edged debris could be jeopardized. For disposal of these types of materials, the standard macroencapsulation techniques are used. These include placing the wastes in a stainless steel box or plastic drum, or encased in Portland cement in a standard metal box. An alternative method or bag is needed to address disposal of low level radioactive contaminated heavy debris and debris with sharp edges.

OBJECTS OF THE INVENTION

One object of the invention is to provide a softsided macroencapsulation bag that can be used as the exterior enclosure for standard metal or plastic disposal containers.

BRIEF DESCRIPTION OF THE FIGURES

FIG. 1A is a prospective view of a prior art softsided bag in an open configuration that can be used in the method.

FIG. 1B is a prospective view of a prior art softsided bag in an open configuration that can be used in the method.

FIG. 2A is a prospective view of one embodiment of an inner layer of a softsided bag that can be used in the method. FIG. 2A shows an open configuration.

FIG. 2B is a prospective view of one embodiment of an inner layer of a softsided bag that can be used in the method. FIG. 2B shows a closed configuration.

FIG. 3A is a prospective view of one embodiment of a middle layer of a softsided bag that can be used in the method. FIG. 3A shows an open configuration.

FIG. 3B is a prospective view of one embodiment of a middle layer of a softsided bag that can be used in the method. FIG. 3B shows a closed configuration.

FIG. 4A is a prospective view of one embodiment of an assembled layer of a softsided bag that can be used in the method. FIG. 4A shows an open configuration.

FIG. 4B is a prospective view of one embodiment of an assembled layer of a softsided bag that can be used in the method. FIG. 4B shows a closed configuration.

DETAILED DESCRIPTION OF THE INVENTION

The present system uses the combination of a hard sided container and a soft-sided disposal bag to create a robust less expensive disposal container, that can accommodate heavy debris or debris with sharp edges, and that meets regulatory approval guidelines (such as RCRA treatment methods and DOT transportation package guidelines). However, the hard-sided container does not have to meet the standards of an "approved disposal container," and can hence be a less expensive container, such as a standard steel or metal drum, standard waste boxes and shredder boxes. The prior art PacTec HMPPS product can be used in the current technique, as well as a new soft sided enclosure. The new softsided enclosure is again a three (or more) layer series of nested bags. Preferably, the inner layer, shown in FIGS. 2A and 2B, is a non-woven synthetic material, such as non-woven polypropylene or polyester. At least one middle layer (e.g. all layers between the inner and outer layer are "middle layers") is a water proof layer, such as a layer of polyvinylchloride (PVC) or polyethylene film, or polypropylene film or other water proof synthetic material. One embodiment of a middle layer is shown in FIGS. 3A and 3B. The outer layer is preferably a non-woven synthetic material, such as a polypropylene, but may be a woven synthetic material, such as woven polypropylene. If a lift strap system is not included, the outer layer may include loops attached near the top edge to help support the enclosure (for instance, to attach to a load frame). One embodiment of an outer layer is shown in FIGS. 4A and 4B. As in the HMPPS product, each layer is separately closable, with the inner and outer layers closing with a zipper, and the middle layer closable with a water tight zipper, or a ziploc type of closure device. The inner layer may have pockets in the sidewalls (such as a pocket with an opening along the top edge of the sidewall) in which cardboard inserts or other fairly rigid inexpensive material may be inserted to allow the assembled product to be self-standing. Alternatively, cardboard (including plastic corrugated sheets or plastic cardboard, corrugated fiberboard, paperboard, etc.) may be used without pockets, such as placing cardboard panels in the interior, or between the inner layer and middle layer, or between the middle layer and outer layer, or between two middle layers. Preferably, the zippers on each layer are centered on the top portion of each layer (a centered zip container), but other configurations are within the scope of the invention, such as a "U shaped extending around the edges of the enclosure on at least three sides. In one alternate embodiment, the inner layer lacks a zipper. The inner layer maybe be shut with Velcro hook and loop fabric or be tied closed, have snap closures, etc. The inner and middle layers may have different top construction from the outer layer. For instance, the outer layer and middle layers may be center zipped, while the inner layer has a "U" shaped zipper closure.

The technique also uses hard-sided containers, such as standard metal boxes and drums, or plastic boxes or drums, in the following method.

The Method.

In the present technique, the soft-sided disposal containers described above are assembled into a nested layered enclosure and either positioned in a loading frame, metal box, or set up as a self-standing product with the use of cardboard inserts. If self-standing, the assembled enclosure can be assembled on a pallet or other transportable frame. All three layers are opened, ready for reception of the low level radioactive hazardous wastes. If the layers use a center opening after each layer is opened, working from the outer layer to the inner layer, the excess top fabric is "inverted' inside out and folded over the top edge of loading frame or metal box, or the top edge if the enclosure is self-standing or self-supporting.

A layer of approved absorbent may be positioned on the bottom of the inner liner as required by the disposal site operator. In general, the low level radioactive hazardous wastes debris is temporarily stored at the generating site in hardsided containers, such as standard metal drums or boxes. In this case, the prior containerized the low level radioactive hazardous wastes containers are lifted and loaded directly into the interior of the soft-sided enclosure. If the low level radioactive hazardous wastes is not so containerized, it must be first loaded into the desired hardsided container and then the loaded hard sided container is positioned in the interior of the soft-sided enclosure. Preferably, the hardsided container is closed, but is not necessary to be welded shut. For instance, the metal box can be bolted shut. Alternatively, the hardsided containers may first be positioned in the interior of the hardsided container and loaded, but this is not preferred. If desired by the disposal site operator, void space between the hard sided containers within the softsided enclosure may be filled, for instance, with kitty litter, foam plastic pellets or other disposal site approved filler material (filling the void space means that about 60-100% of the void space is filled, more preferred, 90-100% of the void spaces). Instead of filler, additional low level radioactive hazardous wastes may be positioned in the void space, if the low level radioactive hazardous wastes is compactable debris that is malleable and not too heavy (such as clothing, herculite, paper, etc.). Additionally, any void space within the hard-sided container may also be filled as specified by the disposal site operator.

The three layers of the enclosure are closed. For the center zip enclosure, starting at the innermost layer, each layer is re-inverted to outside-out, and the closure device is closed. The top portion of each layer is folded as disclosed in the U.S. Pat. No. 8,894,282, or folded in some other fashion to allow closure of the next layer. After closing the middle layer, the ziploc zipper (or other closable device) may be tapped over with waterproof tape for additional protection. The loaded enclosure is moved to a transport vehicle for transport to the disposal site. A lifting sling may be used (such as an attached lifting sling as shown in the U.S. Pat. No. 8,894,282, or a completely detached sling or set of straps) to raise and lower the loaded softsided bag, or a forklift may be used to pick up a pallet if the bag is located on a pallet. If palleted, the pallets may be stacked. At the site, the softsided enclosure, with the containerized the low level radioactive hazardous wastes within, is then located for disposal, such as by burying. If the softsided container was transported in a metal or hardsided transport container, the softsided container would be removed from the transport container for burial.

The enclosures can be sized for the container, for instance, for a 55 gal drum, a 110 gallon drum, or multiple 55 or 110 gallon drums, or standard waste boxes, such as B-25 (6×4×4 metal container) or BR-90s (a 90 cubic foot metal box). Preferably, the enclosure is fairly close fitting for the container to be stored therein (for instance, a few inches of clearance).

It seems counter-intuitive to load a prior loaded hardsided container into a soft sided container for disposal. However, the softsided enclosure provides an additional sealing barrier (the middle layer), while the inner and outer layers protect the integrity of the middle layer. The inclusion of the hard sided container within the interior of the softsided enclosure protects the softsided enclosure for the hazards of sharp edged low level radioactive hazardous wastes and helps distribute the load of heavy such materials providing an additional layer to maintain the integrity of the middle layer of the softsided enclosure. With the double layer of protection, expensive stainless steel drums and boxes can be avoided, making for a more economical disposal of the low level radioactive hazardous wastes.

This same technique could be used with hazardous wastes that are not necessarily low level radioactive contaminated wastes. For instance, the technique can be used with disposal of circuit boards, mercury contaminated wastes, and other hazardous wastes, including wastes referred to as "classified wastes" per the Department of Energy, which include hazardous and non-hazardous non-radioactive wastes, as well as mixed low level wastes and low level radioactive wastes.

The invention claimed is:

1. A method for preparing low level radioactive hazardous materials (LLHZ) for disposal which comprises: providing a softsided transportable container at a hazardous debris collection site, the softsided container including a bottom, side walls and a top defining an interior space; said softsided container having at least three layers of materials, an outer, middle and an inner layer, where the middle layer is a water impervious material, each layer having a closable opening located on the top of the container; providing a hardsided closed container containing LLHZ in the interior of said container, loading said hard sided container into the interior of the softsided container, and closing each of said closable tops of said inner, middle and outer layers.

2. A method for preparing LLHZ for disposal according to claim 1, wherein the hardsided container comprises a metal or plastic container.

3. A method for preparing LLHZ for disposal according to claim 1, further comprising transporting the softsided container containing said hardsided container to a landfill site and burying the softsided container containing said hardsided container at the landfill site.

4. A method for preparing LLHZ for disposal according to claim 1, wherein each of said layers is closable with a zipper.

5. A method for preparing LLHZ for disposal according to claim 4, where said zipper on said middle layer is a water tight zipper.

6. A method for preparing LLHZ for disposal according to claim 2, wherein the inner layer has a pocket in said sidewall and a rigid material is positioned in said pocket to thereby allow said softsided container to be self-supporting.

7. A method for preparing LLHZ for disposal according to claim 1 further comprising the steps of filling the void space in said interior of said softsided enclosure with a filler after the hardsided container is positioned in said interior.

8. A method for preparing LLHZ for disposal according to claim 1 wherein the void space in said interior of said softsided enclosure is not filled with a filler.

9. A method for preparing LLHZ for disposal according to claim 1 wherein said LLHZ contains objects with sharp edges.

10. A method for preparing LLHZ for disposal according to claim 1 wherein said hardsided container is a 55 gallon drum.

11. The method for preparing LLHZ for disposal according to claim 6 wherein said rigid material comprises cardboard material.

12. The method for preparing LLHZ for disposal according to claim 6 wherein each of said layers is closable with a zipper.

13. The method for preparing LLHZ for disposal according to claim 3 wherein said inner layer is constructed of non-woven polypropylene.

14. The method for preparing LLHZ for disposal according to claim 13 wherein said outer layer is constructed from woven or non-woven polypropylene.

15. The method for preparing LLHZ for disposal according to claim 2 wherein said middle layer is closable with a toothless zipper.

16. The method for preparing LLHZ for disposal according to claim 15 wherein said inner layer is closeable with a zipper.

17. A method for preparing LLHZ for disposal according to claim 2, wherein the softsided transportable container further comprises a rigid material positioned adjacent the inner layer.

18. The method of claim 1 wherein said hardsided closed container is sealed closed.

19. A method for preparing low level radioactive hazardous materials (LLHZ) for disposal which comprises: providing a softsided transportable container at a hazardous debris collection site, the softsided container including a bottom, side walls and a top defining an interior space; said softsided container having at least three layers of materials, an outer, middle and an inner layer, where the middle layer is a water impervious material, each layer having a closable opening located on the top of the container; providing a hardsided closable container, positioning LLHZ in the interior of said container, closing said hard sided container, loading said hard sided container into the interior of the softsided container, and closing each of said closable tops of said inner, middle and outer layers.

20. The method of claim 19 wherein said step of loading said hard sided container into the interior of the softsided container occurs before said step of positioning LLHZ in the interior of said hardsided container.

* * * * *